United States Patent [19]

Colson et al.

[11] Patent Number: 4,849,039

[45] Date of Patent: Jul. 18, 1989

[54] METHOD AND APPARATUS FOR MANUFACTURING BLIND MATERIAL

[75] Inventors: Wendell Colson, Boulder; Paul Swiszcz, Lafayette, both of Colo.

[73] Assignee: Hunter Douglas,Inc., Upper Saddle River, N.J.

[21] Appl. No.: 196,832

[22] Filed: May 16, 1988

Related U.S. Application Data

[63] Continuation of Ser. No. 3,967, Jan. 16, 1987, abandoned.

[51] Int. Cl.⁴ .............................................. B32B 31/18

[52] U.S. Cl. .................................... 156/197; 156/250; 156/264; 156/512; 156/526; 156/533; 428/116; 428/118

[58] Field of Search ............... 156/193, 197, 198, 250, 156/264, 512, 522, 523, 526, 530, 533, 574, 575, 577, 578; 428/73, 116, 188

[56] References Cited

U.S. PATENT DOCUMENTS

| | | | |
|---|---|---|---|
| 3,025,964 | 3/1962 | Summers et al. | 156/197 |
| 3,074,839 | 1/1963 | May et al. | 156/197 |
| 4,500,380 | 2/1985 | Bova | 156/197 |
| 4,676,855 | 6/1987 | Anderson | 156/197 |
| 4,677,012 | 6/1987 | Anderson | 156/197 |

FOREIGN PATENT DOCUMENTS 1568745 5/1969 France .

*Primary Examiner*—Caleb Weston
*Attorney, Agent, or Firm*—Pennie & Edmonds

[57] ABSTRACT

Method and apparatus for manufacturing cellular blind material and in particular honeycomb blind material. A material feeding means moves along and parallel to a stack supporting means. The material feeding means feeds a layer of blind material onto the stack and a hot melt adhesive attaches the layer to the stack.

20 Claims, 6 Drawing Sheets

METHOD AND APPARATUS FOR MANUFACTURING BLIND MATERIAL

This is a continuation of application Ser. No. 003,967, filed Jan. 16, 1987, abandoned.

BACKGROUND

This invention relates to a method and an apparatus for manufacturing blind material and in particular mats of honeycomb blind material.

Mats of insulating blind material in the form of a stack of a plurality of contiguous cells are known in the art. Until now these mats have been made by a number of methods which produce substantial quantities of waste.

For example, U.S. Pat. No. 4,388,354 issued June 14, 1983 discloses an apparatus which comprises a rotating cylinder which is wound over by two sheets of blind material. An adhesive is positioned on the sheets at alternate locations as the sheets are wound to create the cells of the blind. Once the material is wound on the cylinder it is cut axially. The mat is then straightened. This method forms layers of unequal length and a tendency of the mat to bend to its curved position.

U.S. Pat. No. 4,450,027 issued May 22, 1984 discloses a method which partially overcomes the drawbacks mentioned above. The method uses a movable rack which rotates as material is wound thereon. The rack has at least two opposite flat surfaces. The material is folded and then wrapped around the rack to form a plurality of layers. Blind mats are cut from the flat surfaces while the turned portions at either end of the surfaces produce unusable mats which go to waste.

SUMMARY OF THE INVENTION

It is an object of the invention therefore to produce a blind mat by a method which reduces waste and produces a flat blind mat in the position of its use thus preventing curling of the material.

The method supports a stack of blind material as additional layers of blind material are added to the stack. A first layer of the material is applied to the stack supporting means. A second layer is then applied to the first layer by positioning a first portion of the second layer onto a compatible portion of a first layer at an end of the stack. The remainder of the second layer is then applied in face-to-face contact with the remainder of the first layer by relative movement between a supply means for the material and the stack supporting means. The relative motion is in a direction extending parallel to the length of the first layer.

The first and second layers are adhered together and then the steps are repeated. Thus a blind mat is quickly created in a flat orientation.

The apparatus has a supporting means for supporting a strip of blind material. A material supply means lays a second layer of blind material on a first layer which is supported by the supporting means. The material supply means includes a material feeding means mounted for movement relative to the supporting means in a direction extending along the length of the first layer and parallel thereto. An adhering means is provided to adhere the first and second layer in face-to-face contact. A cutting means cuts the second layer to the same length as the first layer.

BRIEF DESCRIPTION OF THE INVENTION

DESCRIPTION OF THE PREFERRED EMBODIMENT

Figure 1:
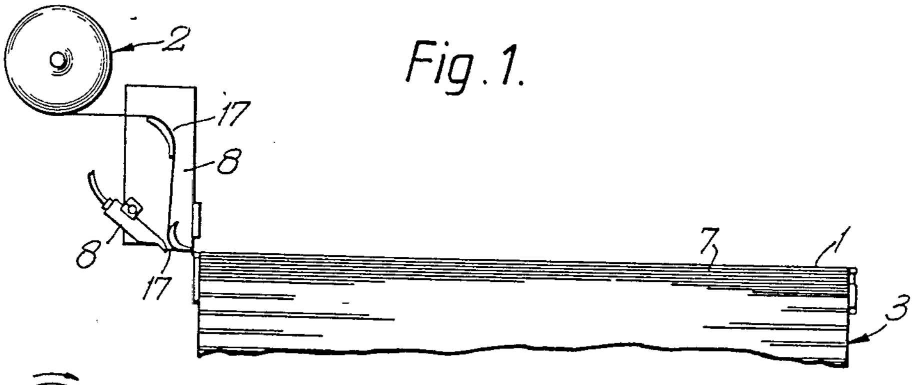
FIG. 1 is a front schematic view of the apparatus of the invention at the end of laying the first layer.
Figure 2:
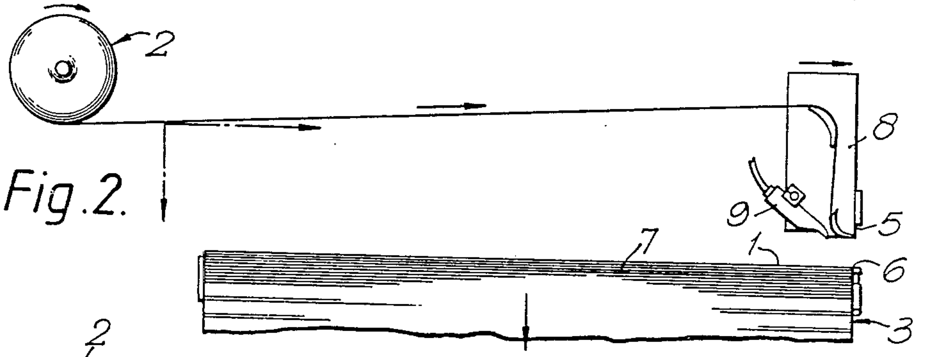
FIG. 2 is a schematic view of FIG. 1 in the return step.
Figure 3:
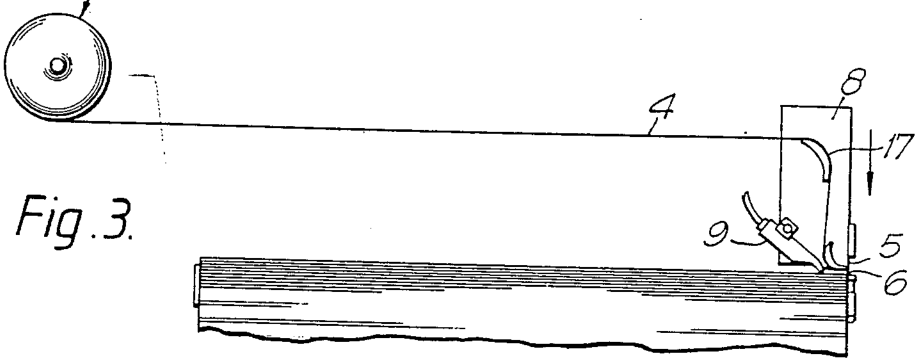
FIG. 3 is a schematic view showing the initiation of the laying of a second layer.

In the method of the invention (FIGS. 1-4) a first layer 1 is pulled from supply roll 2 of strip-like material and laid upon a stack supporting means 3. A second layer 4 is pulled from supply roll 2 (FIG. 2) until the end 5 of the strip like material matches the end 6 of the stack 7. Material feeding means 8 is then lowered onto stack 7.

An adhesive applicator 9 applies at least one adhesive bead to the surface of the first layer 1. The second layer 4 is then applied in face-to-face contact with the first layer by movement of the material feeding means along a direction parallel to the length of the first layer. The adhesive may be a hot melt glue, epoxy or even two adhesive sided tape. The method of the invention permits the use of a quick setting adhesive as the second layer is preferably applied immediately after the adhesive. It should be understood however that a slower setting adhesive may be used and applied at a point remote from feeding means 8.

Alternatively, supply roll 2 may be mounted directly to the feeding means 8 and may ride thereon. The supply may also be an apparatus for forming the strip-like material which moves relative the stack supporting means or which remains stationary as the stack supporting means moves relative thereto.

The second layer is cut to length after being laid upon the first layer. The cutting apparatus may be a rotary cutter, laser cutter, blade or other cutting device.

Figure 4:
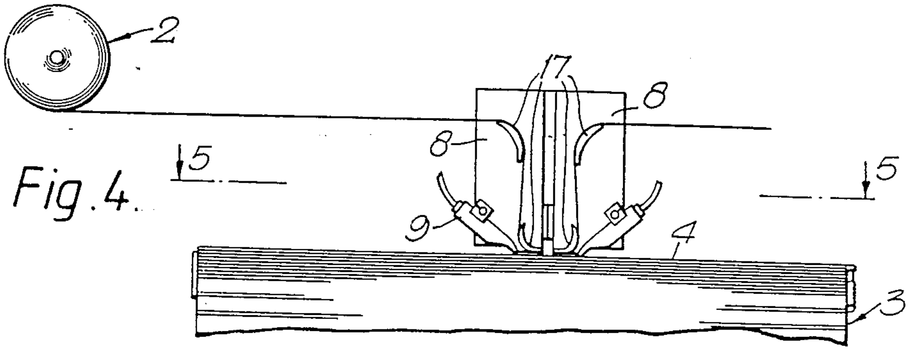
FIG. 4 is a schematic view showing the laying of the second layer.

It is further seen that the material supply means only applies the strip-like material to the stack when moving in the direction shown in FIG. 4. A second material supply means which is a mirror image of the first may be used to supply strip-like material when the material supply means moves in a direction opposite to that shown in FIG. 4. Thus there is no wasted motion of the supply means as it supplies material in both directions using the same adhesive applicator in both directions.

Figure 7:
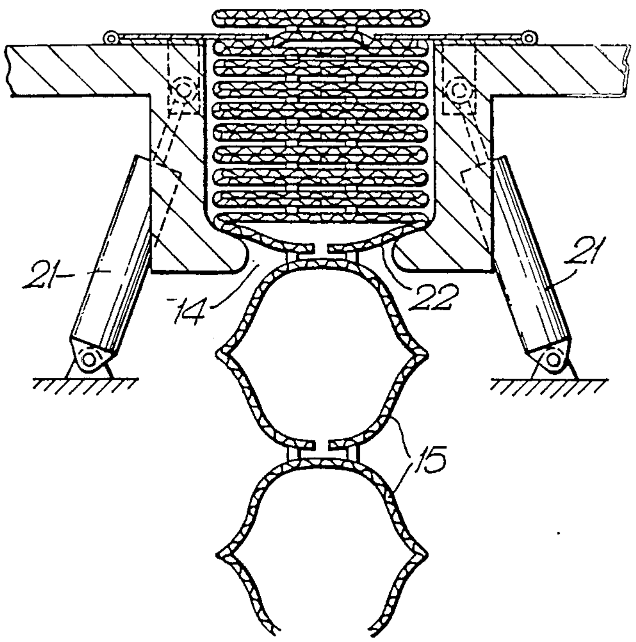
FIG. 7 is an end view of the blind mat in the supporting means of the apparatus along lines 7—7 of FIG. 5.
Figure 8:
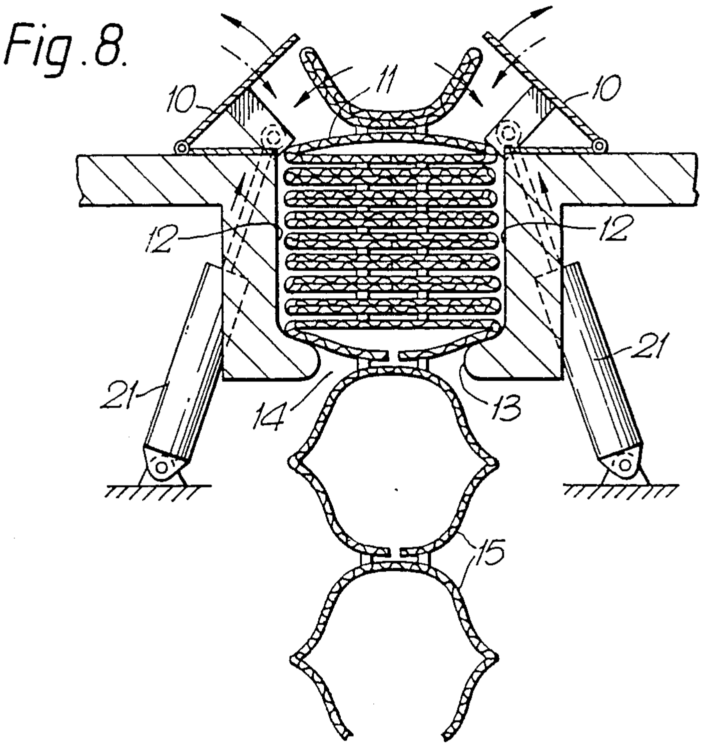
FIG. 8 is the view of FIG. 7 with the supporting members moved to an open position.

The strip-like material may be unfolded flat, single layer material, tubular (circumferentially closed) material, folded in a Z-shape or in a shape as shown in FIGS. 7 & 8. If unfolded or tubular material is used, a single supply is all that is necessary for the dual direction application described above. If folded material is used, it is necessary to use two separate supplies to assure proper orientation of the folds or the material must be twisted when supplied in one direction and untwisted to supply the other direction.

Figure 5:
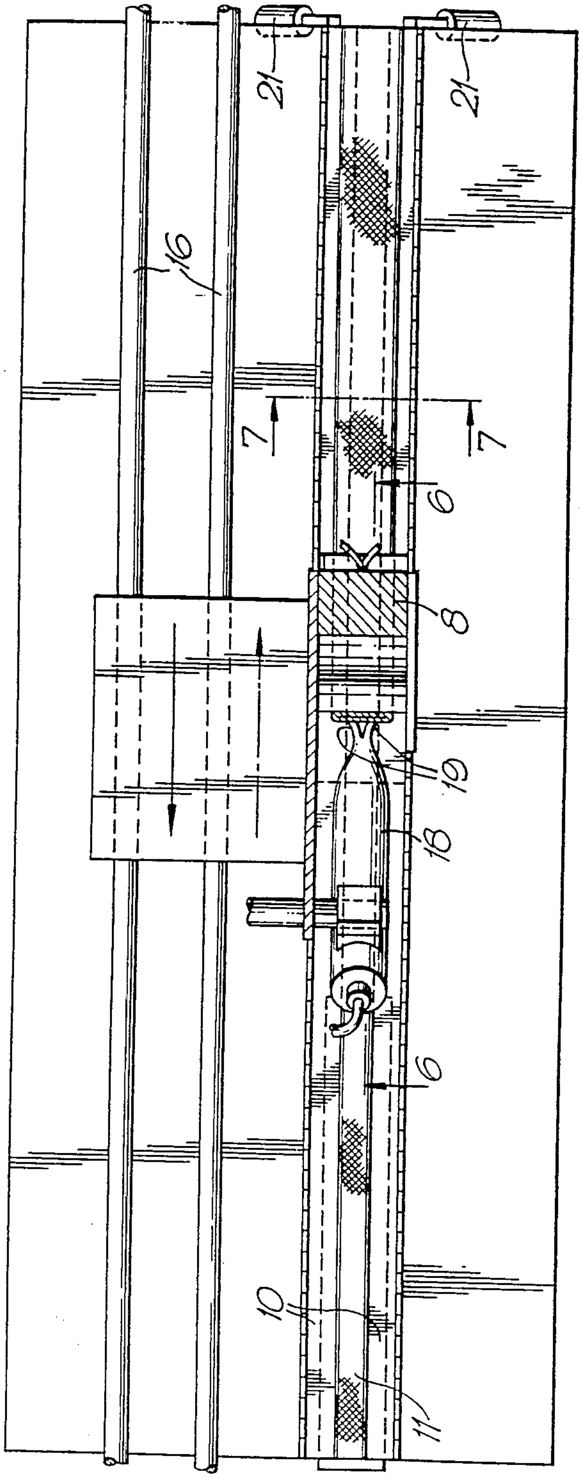
FIG. 5 is a top view of the apparatus of the invention taken along lines 5—5 of FIG. 4 and showing a single source of material.
Figure 6:
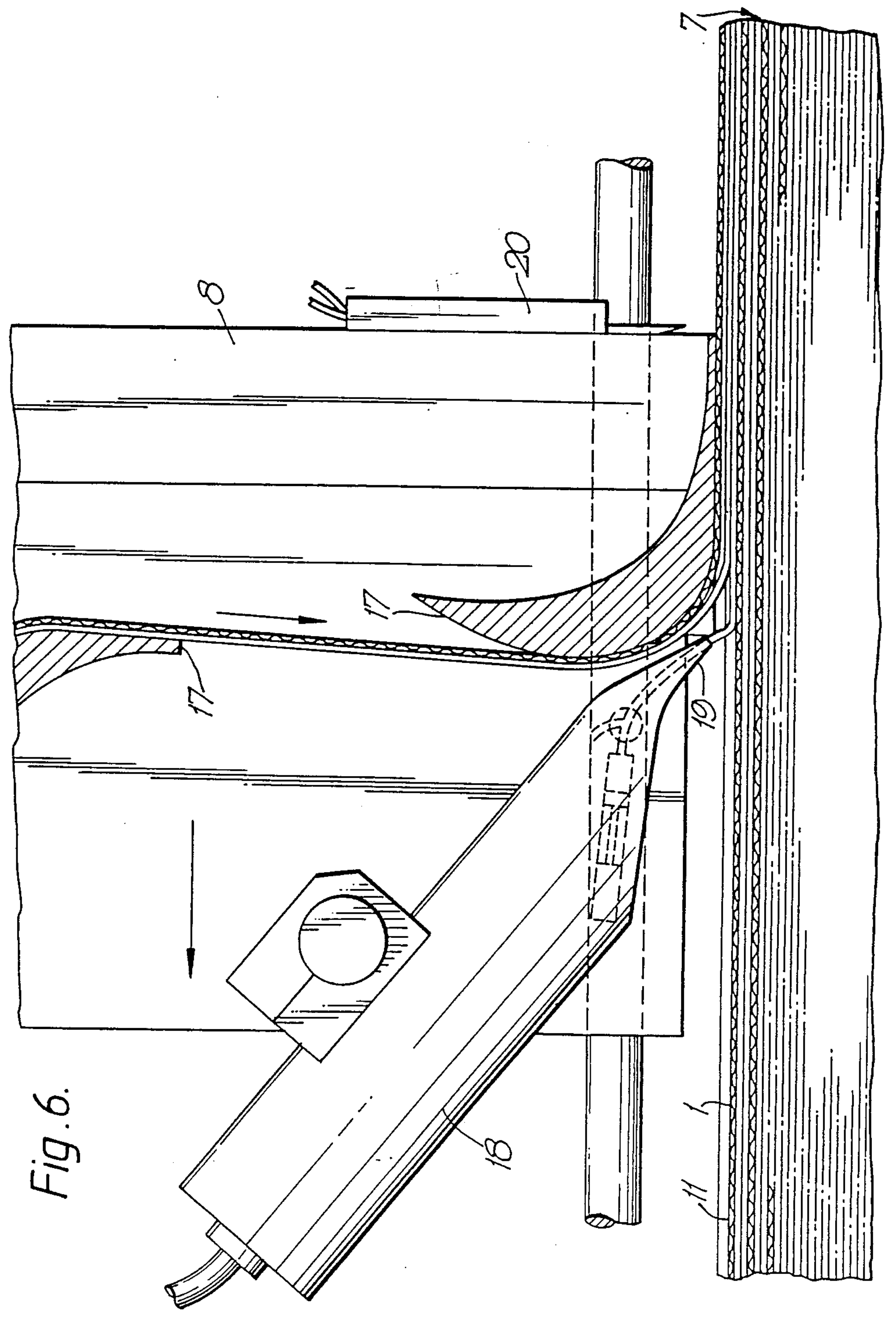
FIG. 6 is an enlarged view of the material feeding means of the invention along lines 6—6 of FIG. 5.

The apparatus of the invention is shown in FIGS. 5 & 6. A stack supporting means 3 holds a stack 7 of blind material. First layer 1 is at the top of the stack beneath a pair of supporting members or flaps 10. The supporting members 10 extend in spaced parallel relation along the upper surface 11 of first layer 1. The supporting members 10 define a longitudinal slot which exposes the central portion of upper surface 11.

The stack supporting means 3 (FIGS. 7 and 8) has a pair of spaced parallel walls 12 which define a space to receive stack 7. At the bottom of each of the walls is a ridge 13 forming a constriction 14 therebetween. The constriction holds a portion of the stack 7 above the constriction and between walls 12. As the weight of the stack increases or under the influence of mechanical forces, the lowest layer is forced through the constriction. This unfolds the blind permitting inspection of cells 15.

A supply roll 2 supplies strip-like material to a material feeding means 8. The material feeding means 8 is mounted on bars 16 for linear movement parallel to the length of stack 7. The material feeding means 8 includes a pair of guide-surfaces 17 which guide the strip-like material from a supply to the upper surface 11 of first layer 1.

An adhesive applicator 18 applies adhesive along the upper surface 11 exposed between supporting members 10. Preferably a folded material is used and therefore two beads of adhesive are supplied through a pair of spouts 19 on the adhesive applicator. This apparatus is particularly suited to the use of hot melt adhesives. A metered amount of adhesive is applied to the first layer and the second layer is applied immediately thereto to prevent intervening cooling.

Figure 9:
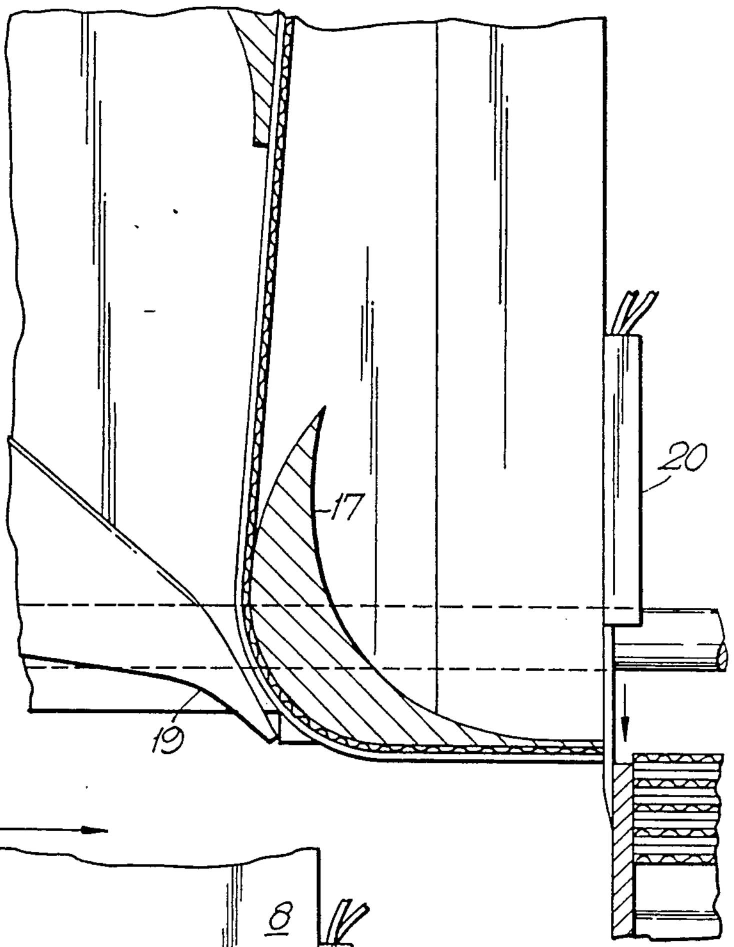
FIG. 9 is an enlarged view showing the cutting means of the apparatus.

At the end of the application of second layer 4, the layer is cut to length by cutting means 20 (FIG. 9) cutting means 20 is shown as a reciprocating blade but may be a laser, rotary cutter or any other suitable cutting mechanism.

After the second layer 4 is cut supporting members 10 rotate from a supporting position (FIG. 7) to an open position (FIG. 8). The supporting members are in the form of hinged flaps and are rotated to the open position by linear actuators 21. The weight of the additional layer and the mechanical action of the support members 10 closing forces lowest layer 22 through constriction 14 where it opens for inspection. It should be noted that it is possible to make constriction 14 so as to prevent passage of the lowest layer therethrough thus making the apparatus only usable to manufacture blind mats of a discrete length.

Figure 10:
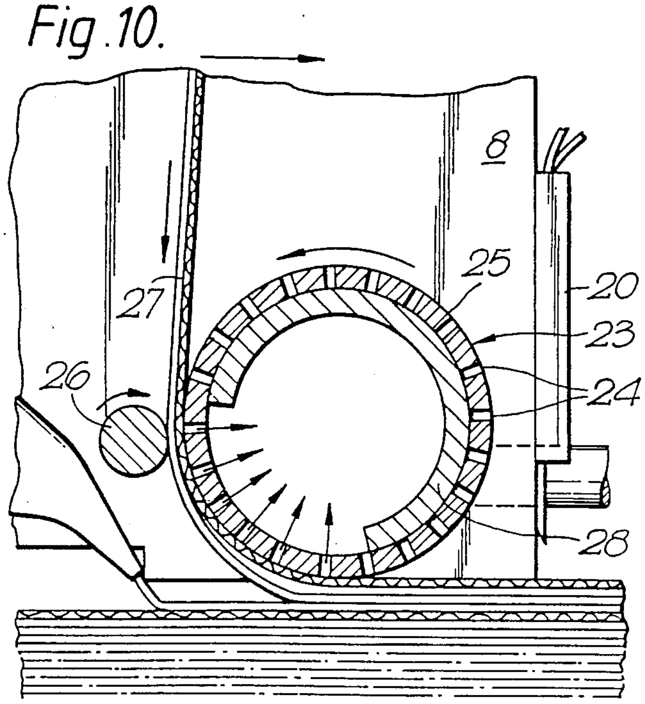
FIG. 10 is an enlarged view of an alternate embodiment of the material feeding means.
Figure 11:
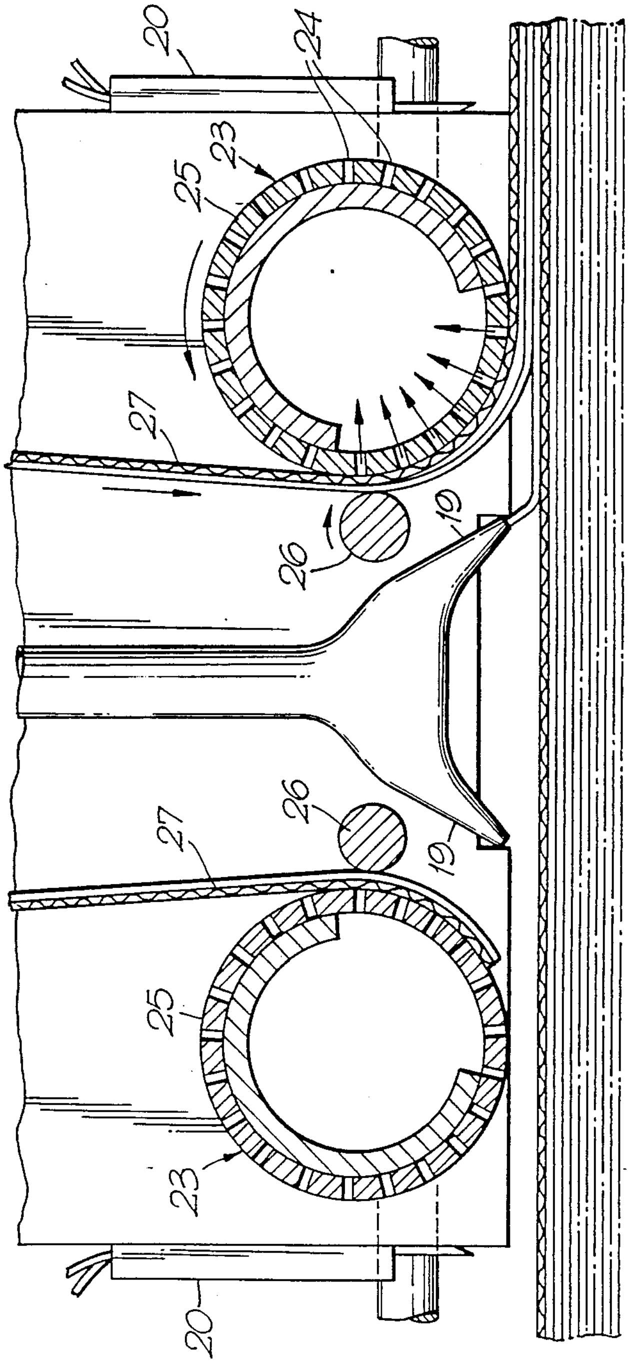
FIG. 11 is a side view, partially in cross-section, of the embodiment of FIG. 10 showing a double source of material.

An alternative embodiment of the material feeding means 8 is shown in FIG. 10. A first roller 23 having a hollow interior communicating with a plurality of openings 24 in its face 25 is positioned with its axis perpendicular to the length of the stack. A second roller 26 is provided with its axis parallel to first roller 23, forming a nip therebetween. Strip-like material 27 is fed therethrough by driving either first roller 23 or second roller 26. A vacuum is created within roller 23 such that the vacuum pulls strip-like material 27 to the face 25 through the difference in air pressure between ambient and opening 24 which communicate with the evacuated space within roller 23. This controls the application of the material. A blockage 28 is provided to isolate the openings after they pass the low point of roller 23 so the material is released.

It should be noted that certain modifications to the apparatus may be made within the scope of the invention. For example, the material feeding means may be mounted to a stationary material folding apparatus and the stack supporting means moved back and forth thereunder. Alternatively, the entire folding and feeding apparatus may be moved. Furthermore, the device may be operated without support members 10. The device then uses the feeding means 8 to feed the second layer directly onto the top of the stack.

We claim:

1. Method of manufacturing an expandable integral blind mat having a plurality of longitudinally extending superimposed cells of predetermined length, from a supply of strip-like material, by stacking of subsequent layers of the material in direct face-to-face contact and adhering said layers comprising the steps of:

(a) applying a first layer of said strip-like material to a stack supporting means;

(b) applying a second layer of said strip-like material to the first layer by:

(i) positioning and holding a first portion of said second layer onto a first portion of the first layer at an end of the stack; and (ii) applying the remainder of said second layer on face-to-face contact with the remainder of the first layer by relative movement between a supply means for the strip-like material and said stack supporting means in a direction extending parallel to the length of said first layer;

(c) adhering the first layer to the second layer;

(d) repeating the steps to produce a required member of subsequent layers; and (e) cutting individually the second and each subsequent layer to length after each said layer is applied.

2. Method of manufacturing an expandable integral blind mat having a plurality of longitudinally extending superimposed cells of predetermined length, from a supply of strip-like material having folded over portions extending longitudinally of the strip-like material to form the cells of said mat by stacking of subsequent layers of the material in direct face-to-face contact and adhering said layers comprising the steps of:

(a) applying a first layer of said strip-like material to a stack supporting means;

(b) applying a second layer of said strip-like material to the first layer by:

(i) positioning and holding a first portion of said second layer onto a first portion of the first layer at an end of the stack; and (ii) applying the remainder of said second layer in face-to-face contact with the remainder of the first layer by relative movement between a supply means for the strip-like material and said stack supporting means in a direction extending parallel to the length of said first layer;

(c) adhering the first layer to the second layer; and (d) repeating the steps to produce a required number of subsequent layers.

3. The method according to claim 2 further comprising cutting the second and each subsequent layer to length individually after said layer is applied.

4. The method according to claim 1 or 2 wherein:

(a) adhering the first layer to the second layer includes applying hot melt glue to at least one of the first and second layers immediately before the second layer is applied to the first layer to adhere the first and second layers upon cooling of the hot melt glue.

5. The method according to claim 4 wherein:

(a) said hot melt glue is applied to said first layer as at least one bead running substantially the length of the first layer.

6. The method according to claim 1 or 2 wherein:

(a) the material supply means applies the material upon relative movement between said supply means and said first layer in a first direction along the stack but not when moving in a second direction opposite to said first direction.

7. The method according to claim 1 or 2 wherein:

(a) the material supply means applies the material upon relative movement between said supply means and said first layer in both a first direction parallel to said first layer and a second direction opposite said first direction.

8. The method according to claim 7 wherein:

(a) the material supply means has a single source of strip-like material for application in both the first and second directions.

9. An apparatus for fabricating expandable blind material comprising:

(a) supporting means for supporting a first layer of expandable blind material having an upper surface and first and second ends separated by a predetermined length;

(b) material supply means for laying a second layer of blind material on said first layer including:

(i) material feeding means mounted for movement relative to said supporting means in a direction extending along the length of the first layer and parallel thereto;

(ii) guiding means on said material feeding means for guiding said second layer onto said first layer; and (iii) adhesive applying means on said material feeding means for adhering said first and second layer in face-to-face contact; and (c) cutting means for cutting said second layer of expandable blind material to a length compatible with said predetermined length.

10. The apparatus according to claim 9 further comprising:

(a) a pair of supporting members extending in spaced relation above said first layer, said supporting members defining a slot therebetween extending along said upper surface to thereby permit contact of a central portion of said second layer with said upper surface while supporting said second layer.

11. The apparatus according to claim 10 wherein:

(a) the supporting members are movable between a first position for supporting said second layer and a second position which permits passage of the second layer therebetween.

12. The apparatus according to claim 9 wherein:

(a) said material feeding means includes a driven roller and a second parallel roller which form a nip to hold and feed said second layer.

13. The apparatus according to claim 12 further comprising:

(a) vacuum means for providing suction on the surface of said driven roller to hold said second layer in contact with said driven roller until said second layer is laid on said first layer.

14. The apparatus according to claim 9 wherein:

(a) said supporting means comprises a pair of spaced walls having face-to-face parallel inner surfaces defining an elongated slot therebetween for guiding a stack blind material therethrough and a constriction at a lower part of said slot narrowing the spacing of said inner surfaces to restrict movement of blind material therethrough.

15. The apparatus according to claim 14 wherein:

(a) said constriction prevents movement of blind material therethrough.

16. An apparatus for fabricating expandable blind material of predetermined length comprising:

(a) a pair of spaced walls having face-to-face parallel inner surfaces defining an elongated slot therebetween for guiding a stack of blind material therethrough;

(b) a construction at a lower part of said slot narrowing the spacing of said inner surfaces to provide restriction of movement of said blind material therethrough;

(c) a pair of movable flaps extending perpendicularly to said inner surfaces above said slot in spaced relation to define an elongated opening above said slot, said elongated opening being narrower than said layer of blind material when said flaps are in a first position to support said layer of blind material along side portions of a bottom surface of said layer of blind material and means for moving said flaps to a second position;

(d) material supply means for guiding and positioning said layer of blind material onto an upper surface of said flaps in said first position while a central portion of said bottom surface contacts the top of the stack of blind material;

(e) an applicator for applying adhesive material to at least one of the top of the stack and the layer of blind material as said layer of blind material is guided and positioned by said material supply means to thereby adhere said layer of blind material to the top of said stack of blind material; and (f) a cutter to cut the layer of blind material to said predetermined length.

17. Method according to claim 1 or 2 wherein the second layer of strip-like material being applied to the first layer of strip-like material by moving a material supply means along the length of the first layer, which first layer is held stationary, to position said second layer on said first layer as said material supply means moves along the length of said first layer.

18. Method according to claim 1 or 2 wherein the second layer of strip-like material being applied to the first layer of strip-like material by a stationary material supply means and said first layer is moved beneath said material supply means to effect relative movement between said material supply means and said first layer along the length of said first layer to thereby position said second layer on said first layer.

19. Method of manufacturing an expandable integral blind mat having a plurality of longitudinally extending superimposed cells of predetermined length, from a supply of strip-like material, by stacking of subsequent layers of the material in direct face-to-face contact and adhering said layers comprising the steps of:

(a) applying a first layer of said strip-like material to a stack supporting means;

(b) applying a second layer of said strip-like material to the first layer by:

(i) positioning and holding a first portion of said second layer onto a first portion of the first layer at an end of the stack; and (ii) applying the remainder of said second layer in face-to-face contact with the remainder of the first layer by relative movement between a supply means for the strip-like material and said stack supporting means in a direction extending parallel to the length of said first layer;

(c) material supply means supplying material from two sources of strip-like material and a first source is used for applying in a first direction along the first layer and a second source is used for applying in a second direction;

(d) adhering the first layer to the second layer; and (e) repeating the steps to produce a required number of subsequent layers.

20. The method according to claim 1 or 2 wherein:

(a) the strip-like material has folded over portions extending longitudinally of the strip-like material to form the cells of said mat.

* * * * *

UNITED STATES PATENT AND TRADEMARK OFFICE
CERTIFICATE OF CORRECTION

PATENT NO. : 4,849,039

DATED : July 18, 1989

INVENTOR(S) : Wendell Colson and Paul Swiszcz

It is certified that error appears in the above-identified patent and that said Letters Patent is hereby corrected as shown below:

Title page:

In the references cited, under Foreign Patent Documents, please include:

| Document No. | Date | Country | Name | Class | Sub Class |
|---|---|---|---|---|---|
| 1,397,812 | 6/1975 | Britain | White | 156 | 197 |

Signed and Sealed this

Fifteenth Day of May, 1990

*Attest:*

HARRY F. MANBECK, JR.

*Attesting Officer*

*Commissioner of Patents and Trademarks*